June 3, 1969  L. P. KUTCH  3,447,703
OPERATING MECHANISM FOR VEHICLE DISCHARGE MEANS
Filed Dec. 29, 1966  Sheet 3 of 5
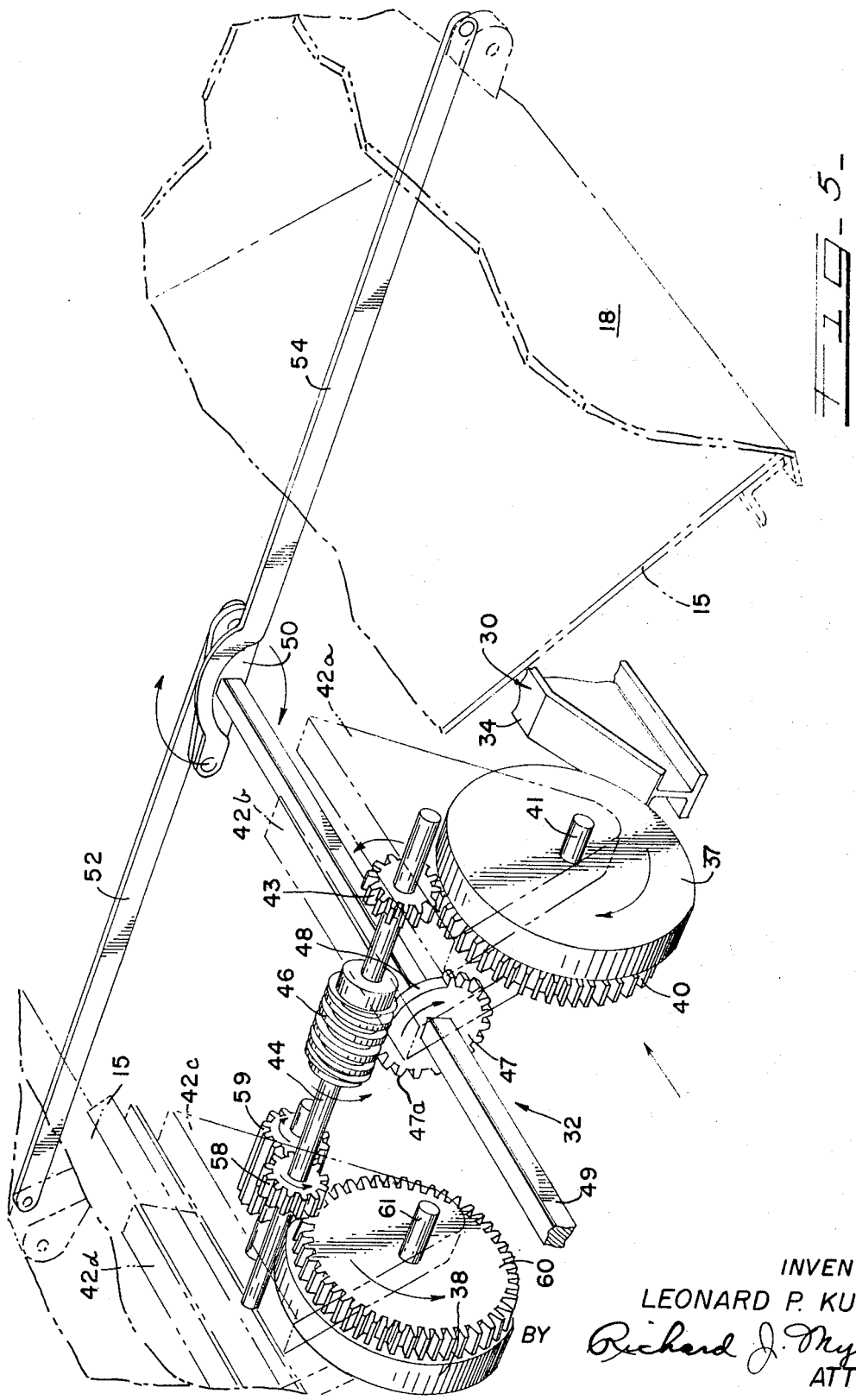
INVENTOR
LEONARD P. KUTCH
BY Richard J. Myers
ATT'Y.

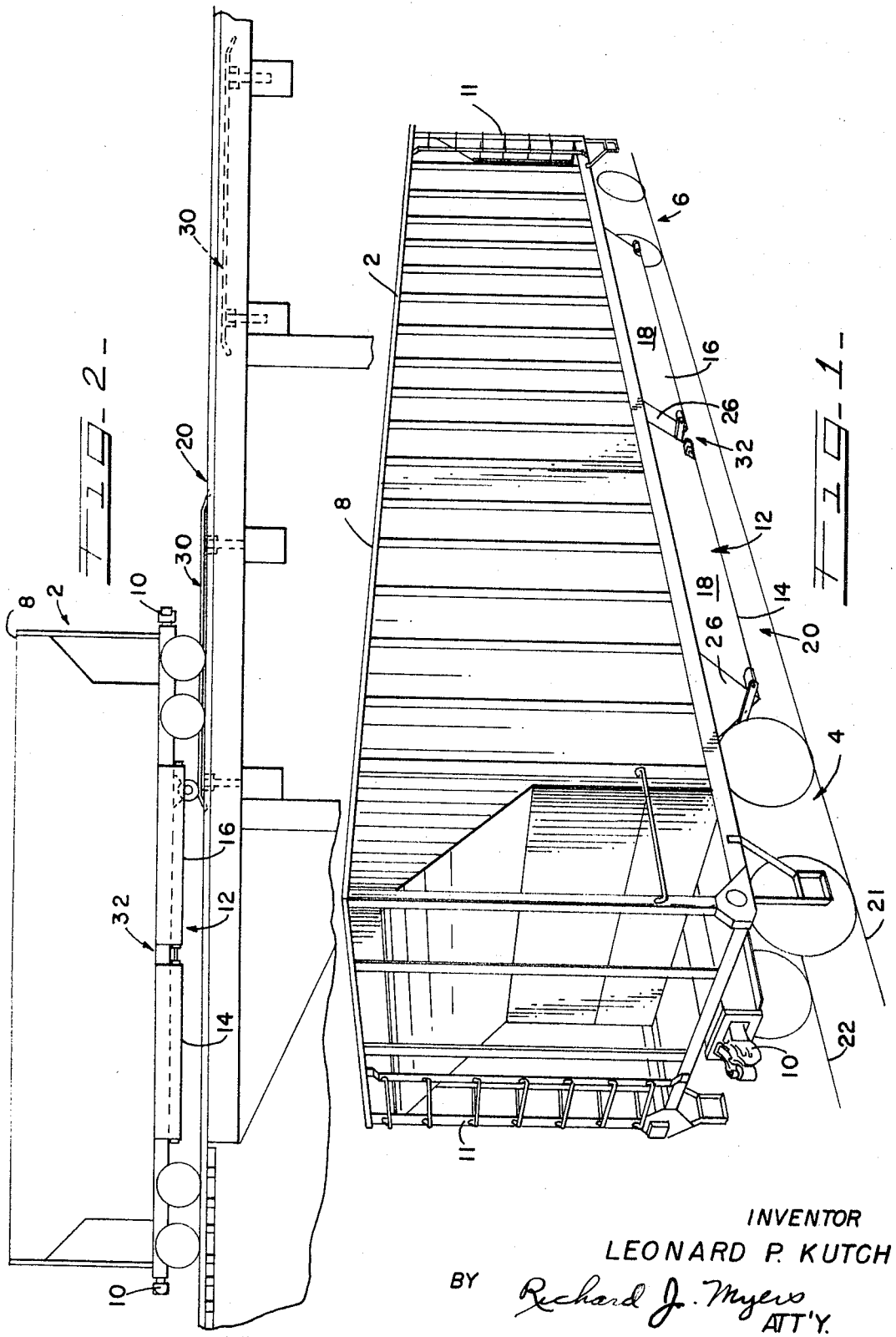

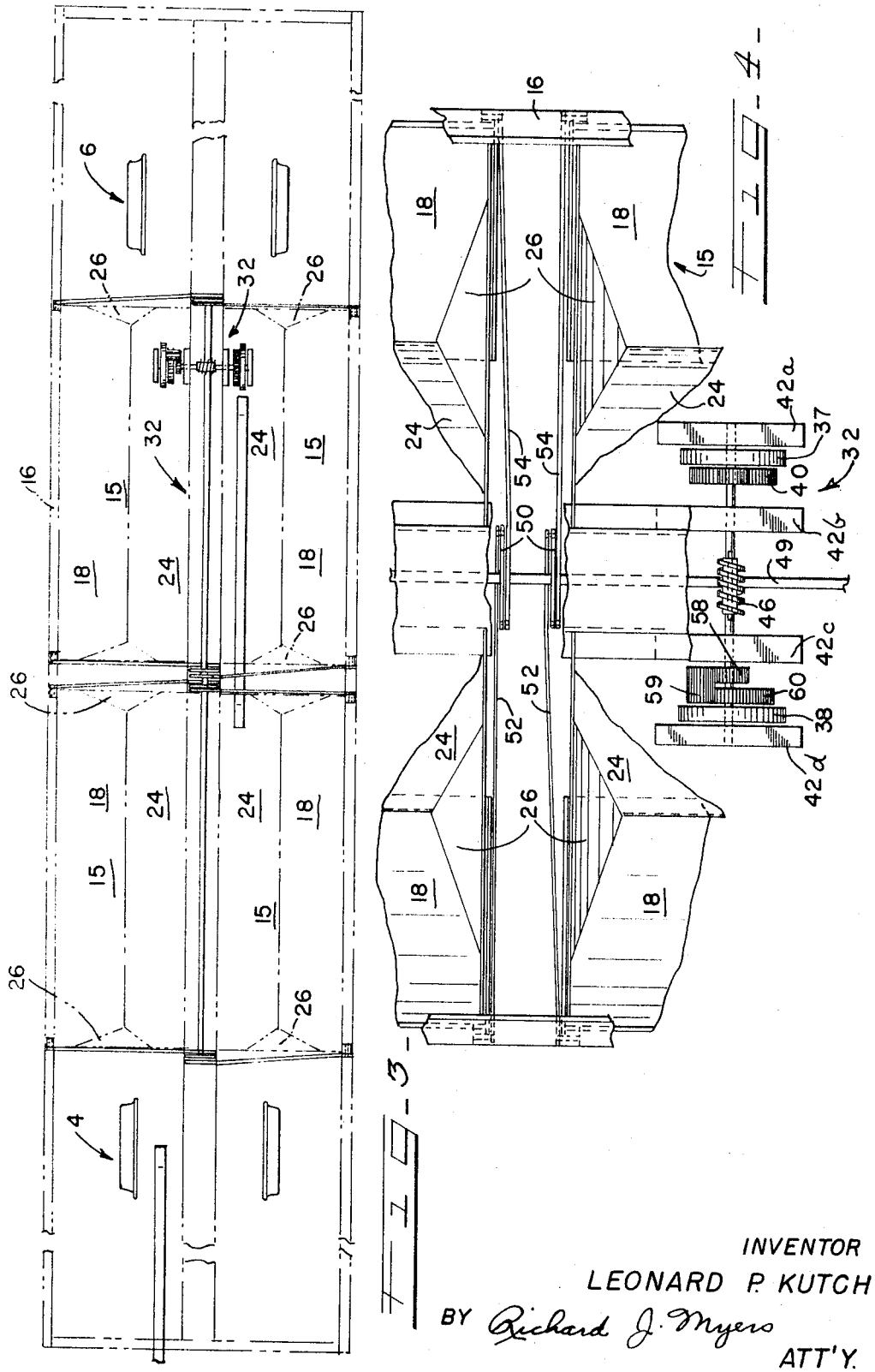

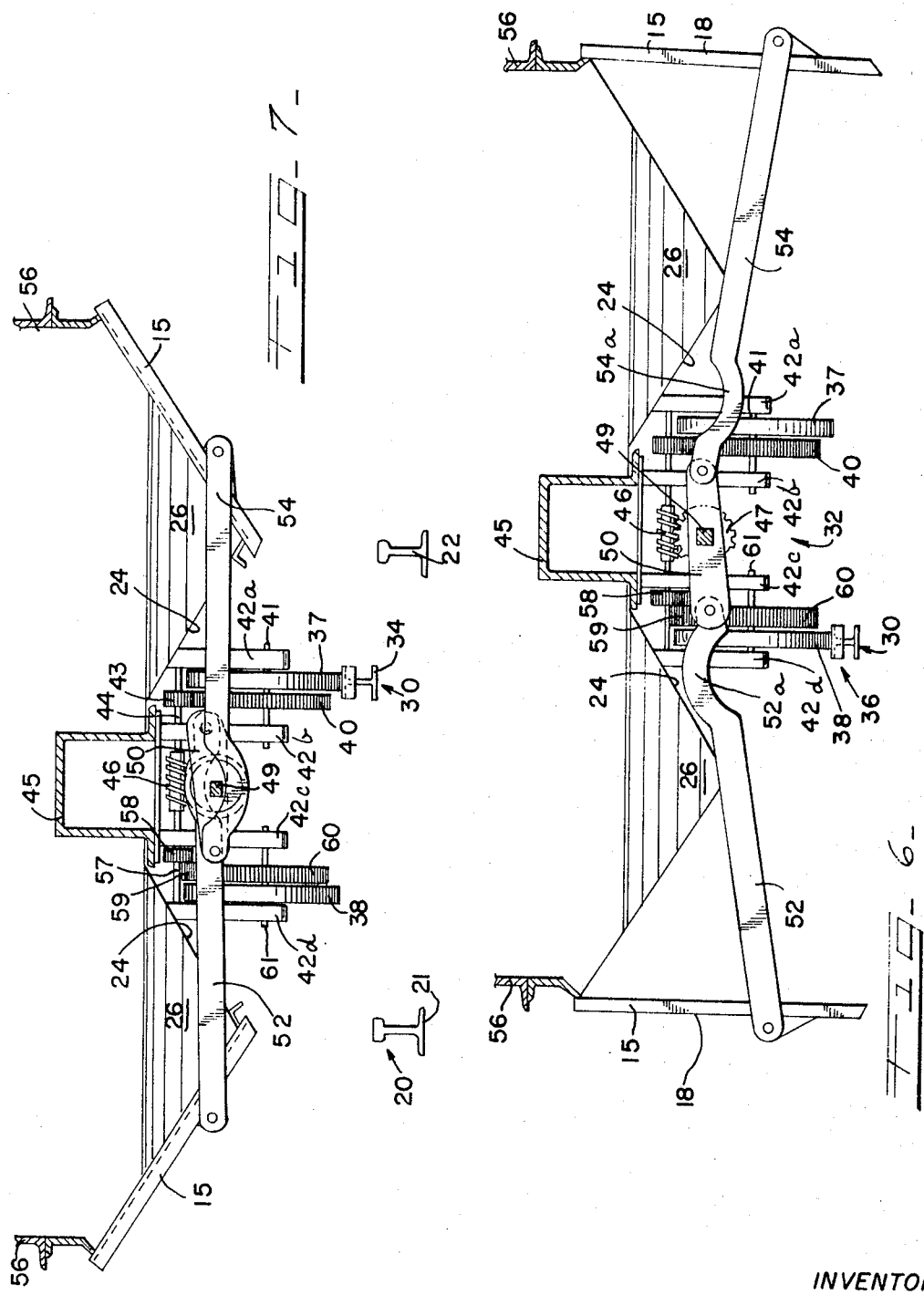

United States Patent Office 3,447,703
Patented June 3, 1969

3,447,703
OPERATING MECHANISM FOR VEHICLE
DISCHARGE MEANS
Leonard P. Kutch, Chesterton, Ind., assignor to Pullman Incorporated, Chicago, Ill., a corporation of Delaware
Filed Dec. 29, 1966, Ser. No. 605,640
Int. Cl. B65g 67/24; B61d 7/08, 7/30
U.S. Cl. 214—63  7 Claims

ABSTRACT OF THE DISCLOSURE

A railroad hopper door operating mechanism comprising rail engaging wheel means having gear structure rotating about a transverse axis to drive a worm or worm gear means which rotates a helical or worm gear means about a longitudinal axis of a longitudinally extending door operating shaft connecting with laterally spaced side opening doors of the railroad vehicle where the initiating door opening rail is disposed beneath the hopper car and between the rails.

BACKGROUND OF THE INVENTION

Field of the invention

A most efficient and economical method of transporting coal or other material is by way of railroad unitized or integral trains of hopper cars. To reduce the cost of delivering the coal, a unitized train depends largely on the number of cars required, and how much time is necessary to unload the cars, shorter loading time providing more efficient and economical train operation. Therefore, what is required is a fast discharge of the coal while the train is in motion. Unloading systems of "over-the-road" locomotive type never leaves the train and the regular crew stays with the train, thus resulting in lower cost to the user through elimination of the switch operations and the special crews needed to unload the cars. The inventive design incorporates features which substantially reduce the operating cost of delivery of the coal.

Description of the prior art

Heretofore various types of door operating mechanisms for side discharge type of railroad car hoppers have been provided where the operation of the door operating mechanism was performed manually at the loading dumping site or by engaging a meandering track to operate a plurality of linkages. This requires either additional manpower or camming of tracks over which the railroad car would pass in order to transmit sufficient motion to the door opening mechanisms. Further, since a limited amount of space is available underneath the hopper cars for door operating linkage the present invention provides an effective solution with a simplified door opening initiation rail means for operating door operating mechanism that requires a minimum of space and yet is uncomplicated and most efficient in its operation.

SUMMARY

This invention relates to an improved mechanism for opening side discharge doors of the railroad hopper car or vehicle where the off-the-car initiating rail is located between the railroad tracks and is of simplfied construction. The invention, in particular, is in the form of a flat rail adapted for frictional engagement with a wheel carrying gearing means in a confined spacing between the hoppers of the railroad car. The invention has for its object, advantage and purpose to provide for a simplified gear construction employing a spur gear means with its axis of rotation transverse to the direction of travel of the vehicle and wherein the rotational output of the spur gear means is transmitted through worm gear means to a helical gear means that has its axis of rotation transverse to the axis of rotation of the spur gear means and rotates shaft means for operating the door operating means located in transverse vertical planes to the direction of movement of the hopper car in order to open and close the hopper doors and yet occupy a minimum of space. Further, the gear means of the invention provide for more slow and smooth opening of the hopper doors. Further, the invention comprehends the multiplication of leverage in transmitting the door opening action from a large gear to a smaller gear or by having a gear of small diameter on the axis of rotation of the rail engaging wheel of larger diameter and also comprehends the use of reversing gear means for closing and opening of the hopper doors in either direction of car travel and from entrance of either end of the car into the dumping area. These and other objects, advantages and purposes will become apparent from reference to the following description, drawings and appended claims.

BRIEF DESCRIPTION OF DRAWINGS

FIG. 1 is a perspective view of the railroad hopper car employing the invention;

FIG. 2 is a view of the railroad car mounted over the novel door operating right-of-way rail or actuating track mechanism located between the railroad tracks;

FIG. 3 is a top plan view of the railroad car;

FIG. 4 is a partial top plan view of the hopper car illustrating the components of the novel invention;

FIG. 5 is a perspective view of the novel door operating mechanism and rail therefor;

FIGS. 6 and 7 show the positions of the door operating mechanism and rail therefor in the "to close" door and "to open" door positions respectively;

DESCRIPTION OF THE PREFERRED EMBODIMENTS

Figure 8:
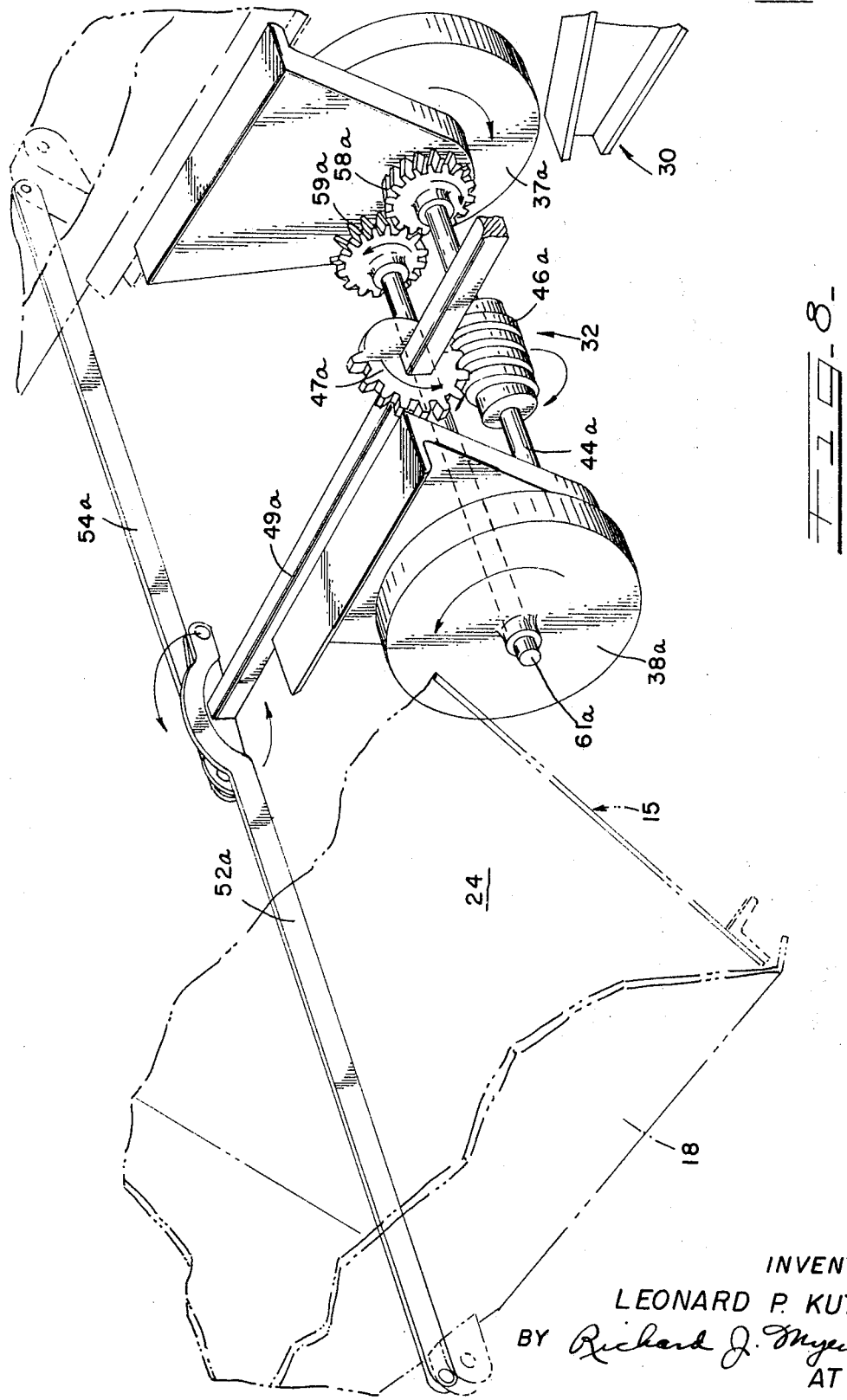
FIG. 8 is a perspective view of a modification of the novel door operating mechanism.

Referring now to FIGS. 1 through 7, there is shown a side discharge hopper car 2 for carrying coal or the like. The hopper 2 is provided with the usual trucks 4 and 6 which carry the car body 8 provided with coupling means 10 at each end of the car and with a ladder 11 at each end of the car and the underneath hopper means 12 which comprises a pair of similar hopper units 14 and 16. Each hopper unit 14 or 16 comprises a pair of laterally spaced V-shaped hopper chutes 15, 15. Each chute is of the side discharge type in that each is provided with a longitudinally extending laterally disposed underside sloping hopper door 18 which in the opened position, as for instance, shown in FIG. 6, is to permit any lading, such as coal, to be discharged laterally out of the side of the car and somewhat outwardly of the rail track over which the car traverses, for instance, outwardly of the track 20 as shown in FIG. 1, 2, or 7, the track 20 consisting of two parallel rails 21 and 22 respectively. Each hopper chute 15 in addition to having a movable laterally outwardly opening door 18 has an inwardly longitudinally extending side 24 to form with the door 18 the V-shaped hopper unit 14 or 16 having the usual end walls 26.

As the coal car traverses along the track 20 in the lading dumping site or area it encounters the door actuating mechanism in the form of a right-of-way structure positioned between the rails 21 and 22, generally indicated as right-of-way or door tripping mechanism 30 as seen in FIGS. 2, 5, 6, 7 and 8, which mechanism 30 in turn operates the door operating mechanism 32 located on the car itself as distinguished from the track means 30 which is located on the railroad bed. When engagement occurs between the structures 30 and 32 during car movement, the door structure 18 is caused to be opened and later to be closed. The actuating device or right-of-way structure 30 for the doors 18 comprises a pair of road bed mounted guide track or guide units 34 and 36 at the dumping site. The track 34 is used for opening of the hopper doors 18 (FIG. 7) whereas the track or rail 36 is used for closing the doors 18 (FIG. 6). As seen in FIGS. 6 and 7 they are spaced laterally of one another and one rail 34 or 36 operates with a corresponding wheel means of the door operating mechanism to be explained later. In the area of the dumping site the actuating rail 34 is first encountered to open the hopper doors 18 and then when dumping of the lading is completed rail 36 is encountered to close the hopper doors, the rail 36 being some distance down the way from rail 34.

The "on car" mechanical door operating mechanism 32 that is actuated by actuating mechanism or right-of-way structure 30, as seen in FIGS. 1 through 7, comprises a wheel 37 which engages the rail 34 and a wheel 38 for engaging the rail 36. Either wheel 37 or 38 for engaging a respective rail 34 or 36 comprises an elastic material or resilient material preferably of a rubber like or elastomeric like substance which frictionally engage its respective rail and is rotated thereby to operate the door operating mechanism 32. The wheel 37 is fixedly mounted to a spur gear 40 the both of which are mounted on a common shaft 41 carried on journal supports 42a and 42b mounted on underside of car 2. The gear 40 is constrained for rotational movement with the wheel 37 and drives pinion gear 43 thereabove which is mounted on shaft 44 which is carried by support 42b and 42c and 42a and 42d, the supports 42b and 42c depending from the center sill structure 45 of the railroad car. The shaft 44 driven by the gear 43 also carries a worm or worm gear 46 which is thereby rotated by the gear 43 and in turn engages the helical or worm gear 47 which has teeth 47a over most of its periphery with the exception of the area indicated as 48 in FIG. 5. It is this portion 48 of the gear 47 where no drive occurs as transmitted from the worm gear 46 to the force transmitting shaft 49 fixedly mounted with respect to said gear 47 and extending longitudinally of the vehicle and having an arm or link 50 fixedly attached thereto and rotated thereby, the outer ends of arm 50 being pivotally connected to door opening rods 52, 54. It is noted that each door opening rod 52 or 54 is sickle-like shaped in that it has a crescent end 52a or 54a that is pivotally connected to a respective outer end of the arm 50. The outer ends of each of the door opening rods 52 and 54 are pivotally connected to their respective doors 18. As viewed in FIGS. 6 and 7 the hopper units 14 and 16 and their doors 18 depend from the side sill structures 56.

The shaft 44 which carries the worm gear 46 has its opposite end 57 carrying another pinion or small spur gear 58 which in turn drives the laterally elongated pinion gear 59 which in turn drives the gear 60 which carries with it rotatively the wheel 38.

As the vehicle or car 2 travels along the railroad track 20 in one direction as, for instance, seen in FIG. 2 or 5 or 7, the right-of-way track engaging wheel 37 engages the right-of-way rail or track 30 and because of the frictional engagement between the elastomeric or rubber type material of the wheel 37 and the steel surface 34 of the rail 30, the wheel 37 is driven in a clockwise direction. The gear 40 mounted on the shaft 41 for movement with the wheel 37 consequently moves in a clockwise direction and pinion gear 43 on shaft 44 rotates with the shaft in the opposite direction with its worm gear 46 to rotate the helical gear about a longitudinal axis transverse to the shaft 44 in a clockwise direction to rotate the ends of the arms 52 and 54 in a clockwise direction to open the doors 18 of the hopper. Closing of the hopper doors 18 is accomplished by the frictional engagement of the wheel 38 with the rail element 36 of the rail means 30 as seen in FIG. 6 because of the presence of the additional idler gear 59 which reverses the direction of the pinion gear 58 to reverse the rotation of the shaft 44 and the worm gear and consequently the (under worm gear) helical gear 47 and the arms 52 and 54 to move the doors 18 from the open position, as shown in FIG. 6, to the closed position as shown in FIG. 7.

FIG. 8 is illustrative of a further embodiment of the invention where there is provided door opening and door closing wheels, 37a and 38a respectively. The door opening wheel 37a is on a different shaft 44a which carries the worm gear 46a for driving the helical gear 47a which is above and which rotates its operating shaft 49a to operate the door operating links 52a and 54a to open the hopper doors 18 as indicated by the direction of the arrows for the various components. There is a parallel shaft 61a that carries the door closing wheel 38a and rotated thereby to rotate its pinion gear 59a which engages gear 58a on the shaft 44 whereby the direction of rotation of the wheel 38a is always reverse of the direction of rotation of the wheel 37a. In the embodiment in FIG. 8 it is seen that parallel shafts 44a and 61a are used having pinion gears 58a, 59a for relatively reversing the rotation of the respective wheels 37a and 38a and consequently the drive from the over-helical-gear worm gear 46a to the over-worm-gear helical gear 47a for opening or closing of the hopper doors 18 whereas in the first embodiment each spur gear 60 and 40 operated by their respective wheels 38 and 37 operate pinion gears 58 and 43 which drive the over-helical-gear worm gear 46 and the helical gear 47, the gear 58 first engaging the gear 59 to reverse the direction of rotation of the helical gear 47.

This construction and arrangement of the door operating mechanism is light in weight and has few moving parts which can be stored in a smaller working area. The use of the gear arrangement has the advantage of opening the doors at a slower rate and, therefore, not subjecting them to any immediate force or jarring action which is taken up in the rotation of the teeth of the gears with respect to each other. The construction as shown in FIG. 5 provides a faster opening of the doors as compared to the embodiment shown in FIG. 8 where the opening is slower and, therefore, the wear on the teeth in the construction as shown in FIG. 8 is less but the door opening action is not as fast.

The foregoing description and drawings are given merely to explain and illustrate the invention and the invention is not to be limited thereto, as those skilled in the art who have the disclosure before them will be able to make modifications and variations therein without departing from the scope of the invention.

What is claimed is:

1. Door operating mechanism for a vehicle discharge means having laterally opening doors for discharging a load laterally outward of the vehicle, comprising:
   a first right-of-way actuating rail engaging wheel means for opening said doors,
   first drive gear means constrained for rotation therewith and mounted on a common axis with said wheel,
   a first shaft disposed adjacent said wheel and said first gear means,
   said shaft extending transverse to the vehicle discharge means,
   first pinion gear means of smaller diameter than said first gear means in meshing relation with said first gear means and fixedly mounted on said shaft,
   worm means fixedly mounted on said shaft,
   a second shaft transverse to said first shaft,
   worm gear means being in meshing engagement with said worm means,
   door operating rod means extending transversely of said second shaft and operably connected therewith for opening the vehicle discharge means doors,
   said doors including a pair of laterally opposed doors,
   said rod means including a pair of opposed transversely extending rods each connecting with a respective door, a transverse link mounted on said second shaft and constrained for rotation therewith, each rod having an end arm portion connecting with a portion of the end of the transverse link on the side of the second shaft opposite the other end of the rod connecting with its door, second pinion gear means fixedly mounted on said first shaft, idler gear means in meshing relation with said second pinion gear means, second drive gear means in meshing engagement with said idler gear means for reversing the rotation of the worm gear means, second right-of-way actuating rail engaging wheel means for closing the doors mounted on a common axis with said second drive gear means and constrained for rotation therewith and laterally spaced from said first wheel means.

2. Door operating mechanism for a vehicle discharge means having laterally opening doors for discharging a load laterally outwardly of the vehicle, comprising:
a first actuating rail engaging wheel means for opening said doors,
a first shaft carrying said first wheel means,
pinion gear means mounted on said shaft,
worm means mounted on said shaft,
a second shaft transverse to said first shaft,
worm gear means having meshing engagement with said worm and said worm gear means being mounted on said second shaft,
transverse door operating rod means connecting with said doors and with said second shaft for opening said doors,
said doors including a pair of laterally opposed doors,
said rod means including a pair of opposed transversely extending rods each connecting with a respective door, a transverse link mounted on said second shaft and constrained for rotation therewith, each rod having an end arm portion connecting with a portion of the end of the transverse link on the side of the second shaft opposite the other end of the rod connecting with its door,
a third shaft being parallel to said first shaft and transverse to the direction of travel of the vehicle,
second reversing pinion gear means on said third shaft in engagement with said first pinion means,
second actuating rail engaging wheel means carried by said second shaft actuating rail for closing said doors.

3. The invention according to claim 1, and
said worm gear means having teeth means of limited extent to limit the amount of door opening.

4. The invention according to claim 2, and
said worm gear means having teeth means of limited extent to limit the amount of door opening.

5. The invention according to claim 1, and
each of said wheel means comprising elastomeric material adapted for frictional engagement with a between-the-tracks actuating rail.

6. The invention according to claim 1, and
right-of-way actuating rail means comprising a rail member adapted for frictional driving with said wheel means.

7. The invention according to claim 1, and
right-of-way actuating rail means comprising a rail member for each wheel means.

References Cited

UNITED STATES PATENTS

| 2,909,294 | 10/1959 | Newell | 214—63 |
| 3,080,075 | 3/1963 | Giesking | 214—63 |
| 3,316,858 | 5/1967 | Fritz | 214—63 X |

ROBERT G. SHERIDAN, *Primary Examiner.*

U.S. Cl. X.R.

105—241, 290, 299, 304, 307